United States Patent [19]

Lopez-Zermeno et al.

[11] Patent Number: 4,737,181

[45] Date of Patent: Apr. 12, 1988

[54] METHOD AND APPARATUS FOR CONTROLLING A PRESSING MACHINE FOR THE MANUFACTURE OF GLASS ARTICLES

[75] Inventors: Jesus A. Lopez-Zermeno; Luis L. Gonzalez-Guerra; Juan Chacon-Villarreal; Mario A. Gonzalez-Lozano; Luis Cardenas-Franco, all of Monterrey, Mexico

[73] Assignee: Vitro Tec Fideicomiso, Monterrey, Mexico

[21] Appl. No.: 22,280

[22] Filed: Mar. 5, 1987

[51] Int. Cl.$^4$ .............................................. C03B 9/40
[52] U.S. Cl. ........................................ 65/29; 65/72; 65/77; 65/163; 65/164; 65/DIG. 13
[58] Field of Search ................... 65/72, 77, 163, 164, 65/DIG. 13

[56] References Cited

U.S. PATENT DOCUMENTS

| | | | |
|---|---|---|---|
| 3,574,587 | 4/1971 | Grundy et al. | 65/164 X |
| 3,607,191 | 9/1971 | Birner et al. | 65/163 X |
| 4,108,623 | 8/1978 | Cardenas-Franco | 65/DIG. 13 |
| 4,162,909 | 7/1979 | Peters | 65/164 |
| 4,162,910 | 7/1979 | Lining et al. | 65/164 X |
| 4,266,961 | 5/1981 | Wood | 65/DIG. 13 |
| 4,367,087 | 1/1983 | Cardenas-Franco | 65/DIG. 13 |

*Primary Examiner*—Arthur Kellogg
*Attorney, Agent, or Firm*—Abelman Frayne Rezac & Schwab

[57] ABSTRACT

In a pressing machine for the manufacture of glass articles, which comprises, a base; a gyratory table composed of mold supporters equidistantly laid out around the table, thereby carrying the molds from one station to the next as the table gyrates intermittently, said table comprising a number of stations, among which are stations of charging, stations for pressing and cooling articles, extracting stations and stations for the cooling of the molds, wherein such stations includes a series of mechanisms; means to drive the rotating table coupled to said table to rotate the same; and a feeder in combination with said machine which provide a gob of glass to the station of charging by each cycle of the machine, a method and an apparatus is provided to controlling the cycle of operation of the machine and the operation of the diverse mechanisms including: a sensor to determine the instant in which a gob of glass is cut from said feeder and position sensors to detecting the real position of the diverse mechanisms of the machine, to derive signals representative of the movements of each mechanism. Control means for processing the signals provided by the sensors in order to start the machine cycle by each cut of gob and for determining the indexing of said table and the operation of each mechanism in accordance with the time determined by said control means. And a valve block connected to said control means to actuate the mechanism in base to the signals that are send by said control means.

8 Claims, 2 Drawing Sheets

METHOD AND APPARATUS FOR CONTROLLING A PRESSING MACHINE FOR THE MANUFACTURE OF GLASS ARTICLES

FIELD OF THE INVENTION

The invention herein described is related to a method and apparatus for controlling a pressing machine for the manufacture of glass articles.

BACKGROUND OF THE INVENTION

The machines for the manufacture of glass articles such as the ones heretofore mentioned have been well known for a long time, and they consist, basically, of a gyratory table provided with a plurality of mold supporters—carrying respective molds for the manufacture of glass articles—which gyrate simultaneously with the table, passing through a number of stations, among which are stations for charging, stations for pressing and cooling of articles, extracting stations, and stations for the cooling of molds, so as to achieve—in a complete cycle—the production of a finished article already cooled to be taken out of the machine and passed onto a belt conveyor, as well as the further total cooling of the mold, in order to renew the cycle with the charging of another glass gob, thus continuing the manufacture of articles.

It is well known, however, that one of the main problems of this type of machines is that the process is controlled by a mechanical timing drum, which comprise, a rotary drum having a plurality of circumferential grooves on its surface, within which a corresponding plurality of cams are arranged in position suitable to timely actuate cam followers associated with cam operated valves to sequentially and timingly operate all the mechanism of the machine.

The prior art timing drum is generally rotatable driven in synchronism with the gob feeding means and with the pressing machine.

As the timing drum associated with the pressing machine rotates, the several fluid operates forming means, including all the mechanisms are mechanically actuated in the required sequence as determined by the control of the valves which are opened and closed by the cams.

While the cam position may be more or less accurately adjusted with the drum stationary at the start of a run, it is generally necessary to adjust the position of said cams when the machine is operating in order to secure an efficient function of the mechanism of the pressing machine. It is generally undesirable to stop the machine during a run to permit adjustment of a cam, since, as is well known in the art, the pressing machine desirably achieve and maintain a thermal balance upon continued operation, and therefore sometimes it becomes necessary to carry out adjustment of certain cams when the machine is working and thus the drum is rotating.

In an effort to avoid the aforementioned problems, the present invention is referred to a method and an apparatus for controlling a pressing machine for the manufacture of glass articles and more specifically to a control system for controlling and protecting the movements of the mechanisms, the indexing of the table and the monitoring of the process variables needed for obtaining good quality press articles with high production rates.

SUMMARY OF THE INVENTION

Accordingly, it is an object of the present invention to provide a method and an apparatus for controlling a pressing machine for the manufacture of glass articles which controls and protect the movements of the mechanisms by means of proximity sensors. Said sensors are installed at the main mechanisms to detect the real position of said mechanisms in order to avoid collisions in case of bad functioning of the machine cycle.

It is another object of the present invention to provide a method and apparatus for controlling a pressing machine for the manufacture of glass articles which will operate the machine cycle in real time, taking as reference the cut of the gob for the indexing of the table.

It is another object of the present invention to provide a method and apparatus for controlling a pressing machine for the manufacture of glass articles, which will be capable of modifying the table rotation according to the cut or temperature of the gob.

The foregoing objects and others anciliary thereto are preferably accomplished as follows.

Accordingly to a preferred embodiment of the present invention, a pressing machine for the manufacture of glass articles, which comprises, a base; a gyratory table composed of mold supporters equidistantly laid out around the table, thereby carrying the molds from one station to the next as the table gyrates intermittently, said table comprising a number of stations, among which are stations of charging, stations for pressing and cooling articles, extracting stations and stations for the cooling of the molds, wherein each stations includes a series of mechanism; means to drive the rotating table coupled to said table to rotate the same; and a feeder in combination with said machine which provide a glass gob to the station of charging by each cycle of the machine, a method and an apparatus is provided to controlling the cycle of operation of the machine and the operation of the diverse mechanisms which includes: a sensor to determine the instant in which a gob of glass is cut from said feeder and position sensors to detecting the real position of the diverse mechanisms of the machine, to derive signals representative of the movements of each mechanism. Control means for processing the signals provided by the sensors in order to start the machine cycle by each cut of gob and for determining the indexing of said table and the operation of each mechanism in accordance with the time determined by said control means. And a valve block connected to said control means to actuate the mechanism in base to the signals that are send by said control means.

The apparatus in accordance with the present invention also has provided a plurality of remote interrupt stations for stop either totally or partially the pressing machine.

The apparatus of the present invention also provide an adjustment of the variations of velocity, when new velocities of the machine are required.

BRIEF DESCRIPTION OF THE DRAWINGS

The novel features that are considered characteristic of the present invention are set forth with particularly in the appended claims. The invention itself, however, together with additional objects and advantages thereof, will be best understood from the following description of a specific embodiment, when read in connection with the accompanying drawing, in which:

DETAILED DESCRIPTION

Figure 1:
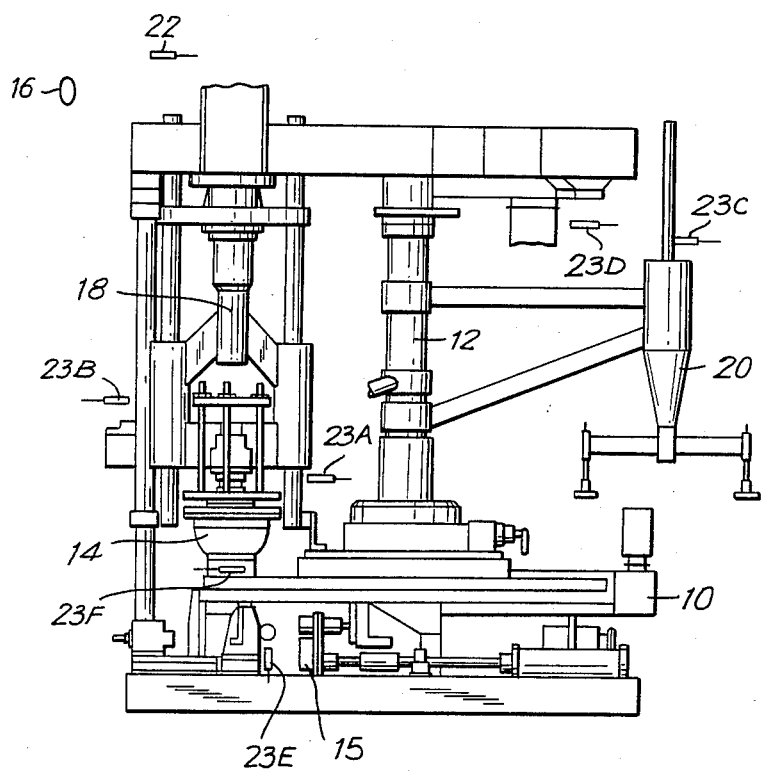
FIG. 1, is a perspective view of the pressing machine, which will be used to describe a particular embodiment of the apparatus built in accordance with the present invention.

Having now more particular reference to the drawings, wherein like parts are designated by like reference characters throughout the various figures, and particularly to FIG. 1, there is shown a pressing machine for the manufacture of glass articles which includes a gyratory table 10 supported by means of a shaft 12 which rotates it in a synchronized relation in respect of the performance of the various stations working on said table 10 where the glass to be converted into finished products is received. The gyratory table 10 is provided with a plurality of molds 14 which may pass from one station to the others ones associated with the gyratory table 10. Means to drive the table 15 are connected to said table 10 for rotating the same.

The stations which compose the machine include: a charging station (not shown), where through a feeder respective gobs 16 of glass are fed, in order to be processed by the following stations. Later, the table is rotated and in a pressing station wherein the glass gob 16 that previously was fed on the mold 14 is pressing. As is clearly illustrated in FIG. 1, a pressing mechanism 18 comprising a piston (not shown) which go up or down, so as to press an article (not shown) within the cavity of the mold 14. In the meanwhile, the charging station is receiving a new glass gob 16, which is later carried, within certain controlled time, toward said pressing station in order to form a new article (not shown).

At the pressing station, immediately that the piston (not shown) is withdrawn, cooling station for the cooling of articles are successively laid, in order to attain a cooling until, the arrival of the article to an extracting station (not shown). Said extracting station comes afterwards, where the finished article are taken out of the molds 14 by means of a take out mechanism 20. Finally, a molding cooling station, wherein said mold is cooled both externally and internally, once the article is extracted, and wherein passes again to the charging station (not shown), in order to repeat the aforementioned cycle.

Making now reference to the apparatus of the present invention, this is showed in connection with a pressing machine as was described in the above, in order to control all the operations of the machine in accordance with the machine cycle.

The apparatus of the present invention as more particularly illustrated in the block diagram of FIG. 1, which comprises: a sensor 22 of cut of gob to determine the instant in which a shear mechanism (not shown) cuts a glass gob to be fed into a mold 14 in the charging station of the machine; position sensors 23 coupled to each mechanism of the machine to derive signals representative of the movements of each mechanism; a controller 24 to processing the signals provided by the sensor 22 of cut of gob to determine by each cut of gob the indexing of the table 10 and by means of the sensors 23 the operation of each mechanism in accordance with the time determined by said control means; and, a valve block 25 that receive the signals from the controller 24 in order to actuate the diverse mechanism in accordance with the machine cycle avoiding in this form a collision between the mechanisms.

The controller 24 also includes, a printer 27 to obtain information the operation times of each mechanism; and a plurality of remote interrupt stations 29 which are stations to stop either totally or partially the functioning of the pressing machine.

Making now reference to the controller 24, this is formed mainly by two modules both represented by means of respective blocks and the basic operation thereof will be described in terms of the operation. The controller 24 comprises a coupler card 30 and a controller card 32. Firstly, making reference to the coupler card 30, this receive the signals detected by the sensors 22 and 23, and thereafter said signals are sent to the controller card 32 to be processed as shall be later described.

Now, making reference to the controller card 32, this comprises: A fixed memory ROM, to store the sequence of operations and the timing of all the ware forming operations of the pressing machine. In this card 32, the signals sent by the coupler card 30 are review. In this manner, the control system is capable of feeding a series of timing signals to the valve block 25 in order to actuate the diverse mechanism of the pressing machine in accordance with the signals obtained by the sensors 22 and 23. A floating memory RAM, to store the timing of certain other variables, which can be altered by the operator. A microprocessor 34, which is programmed to calculate with anticipation the time of movement of each mechanism. Said microprocessor 34 is capable of decipher the stored program in the fixed memory ROM generating the control signals to actuate the valve block 25 which in turn actuate the individual mechanism of the pressing machine, according to the preprogrammed cycle.

Said controller card 32 including, a programmable keyboard 36 which contains a program that has been stored by the machine operator. A sensors signals receiver 38, that receive the signals detected in each mechanism of the machine by means of the sensors 22 and 23; and an alphanumeric display 40 which receive or transmit data to an operator panel 42 for inform to the operator the cycle of the machine. A power supply 39 is provided to operate the controller 24.

Figure 3:
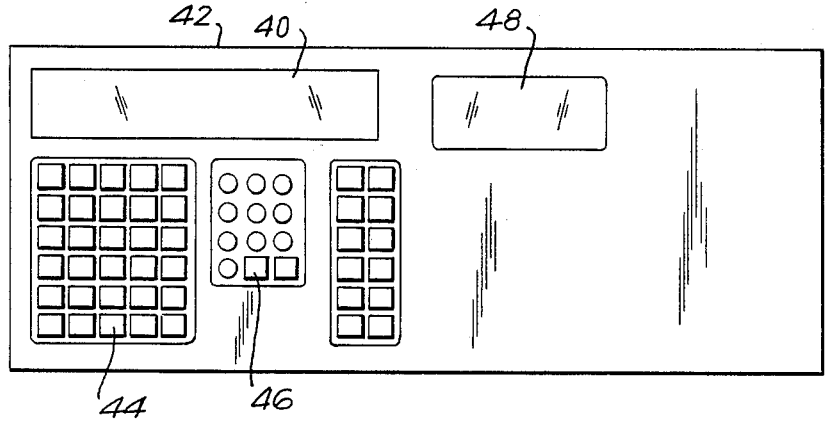
FIG. 3, is a block diagram shown a control panel of the apparatus of the present invention.

With reference to the operator panel 42 (FIG. 3) may be designed to receive and provide information to said microprocessor 34. Said microprocessor 34, contains the alphanumeric display 40 described above, for guide and inform to the operator the sequence of operation of all the mechanisms of the machine. An area 44 to introduce all the data of the mechanisms. A numeric data section 46 and a visual alarm section 48 to indicate through of indicators of sensors (not shown) if the sensors 22 are working correctly in each mechanism.

The different components contained in the control system of the present invention, are communicated through a plurality of lines 50, 52, 54, 56 and 58.

Making now reference to the sensors 23, mentioned above, these are installed in the main mechanisms to detect the real position of them, in order to avoid breakage in case of bad functioning of the machine.

The sensors 23 for detecting the movement of the pressing machine (FIG. 1) are: A sensor 23 A for the funnel mechanism; a sensor 23 B for the piston mechanism; a sensor 23 C for the take out mechanism; a sensor 23 D for the pusher mechanism (not show); a sensor 23 E for the table 10; and, a pressure sensor 23 F for determining the pressure of the gob when this is pressed in said station of pressing. The sensors 23 A, B, C and D were installed in its correspondent mechanisms and the sensor 23 E was installed to detect the position of the table 10 and known if the table 10 is either in movement or stop. All the sensors previously mentioned are checked by the control system in order to avoid collisions between the mechanisms or the table 10. Also, the sensor 23 E of the table 10, is utilized to measure the time of rotation of said table 10 in order to establish the restrictions for protecting the movements between the mechanisms.

The sensor 22 of cut of gob is installed under the shear mechanism (not shown) to detect the instant when said shear mechanism cuts a glass gob, sending a signal to the control system to start the cycle of operation of the machine.

Then, in accordance with the apparatus previously described, the method for controlling the forming cycle in a pressing machine comprising;

detecting through a first sensor the instant when a shear mechanism cuts a glass gob;

sensing, through of sensor means, the diverse mechanisms of the machine, to derive signals representative of the movements of said mechanisms;

determining in response to said sensor means the real position of the mechanisms;

supplying said signals provided by the first sensor and the sensor means to the control means for processing all the signals that were obtained, in order to start the machine cycle in accordance with the first sensor and for determining through the sensors of the mechanisms the operation of said mechanism; and, determining in response to said signals the movement of each mechanism of the pressing machine in order to avoid the collision between each of them.

Figure 2:
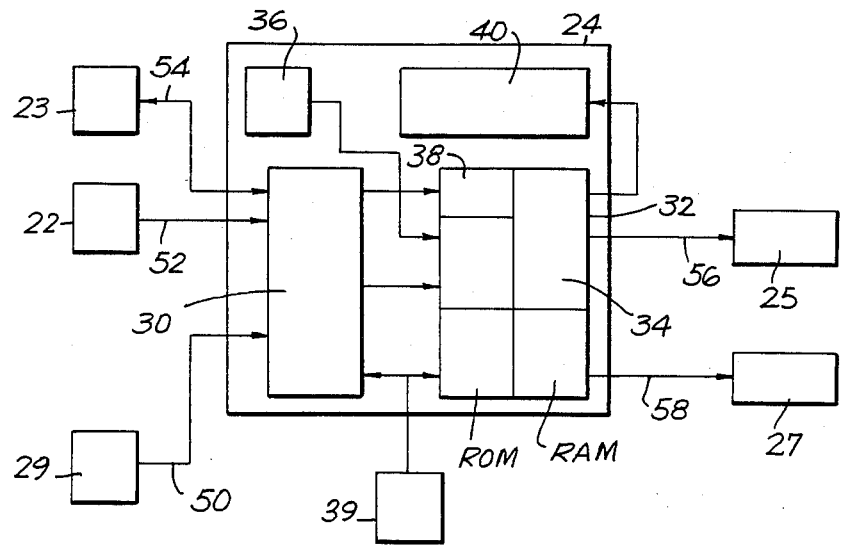
FIG. 2, is a block diagram of the main parts of the apparatus built in accordance with the present invention.

In order to clearly understand the real function of the present invention, the operation of the mechanisms and the cycle time for the manufacture of glass articles, will be described in combination with the FIGS. 1 and 2. Said process of fabrication is started once the cycle time for an article is stored in the fixed memory ROM. In this case, the pressing machine start up when the shear mechanism cut a glass gob, and the funnel mechanism is placed directly above the mold 14. Following to the start up of the cycle machine, once the glass gob has been charged in the mold 14, said funnel mechanism is raised and the funnel sensor 23 A sends a signal to the control system. Simultaneously, the sensor 23 E of the table 10 send a signal to said control to gyrate said table 10. Thereafter, a pressing mechanism 18 is pushed down so that a piston enter into the mold 14 to form the article. The pressure sensor 23 F determines the pressing time of the gob of glass. Said sensor 23 F sends a signal to the control system to measure the pressing operation. However, the control means choose the pressure time either of the operator's time or of the time detected by said sensor 23 F, and later, the piston is raised, according with the cycle time. However, the sensor 23 F inform to the controller if the next operation can be commenced in order to avoid a collision with the next mechanism. Somewhat later, the table 10 gyrates with an intermittent movement (the velocity is determined by the time between each cut of gob), passing through a number of stations of cooling until arriving to the extracting stations where the cooled article is withdraw. In this stage, a take out mechanism take the article at the moment that this is pushed out of cavity of the mold 14 by means of an elevating piston (not shown) and later said article is deposited onto a belt conveyor (not shown), on which it travels to other areas of the manufacturing process. Also, in this stage, the take out sensor 23 C inform to the controller if the take out mechanism has been retired of the machine. Once the article is extracted, the mold 14 is cool in the next stations, through rotation of the table 10, and the mold 14 is again placed in position of charge to commence a new cycle.

Notwithstanding that the previous description has been referred to the manufacture of an article, it should be understood that in a continuous production of articles all the various stations of the machine are working simultaneously in accordance with the cycle time. Said cycle time is previously stored the control system, which depending of the signals that are sent by the sensors 22 and 23 determining the indexing of the table 10 or the movements of the mechanisms.

It will be seen that from the above, a method and apparatus for controlling a pressing machine has been provided, which works exclusively on real times that by means of sensors determine the actual times of execution of the most critical operations in a pressing machine.

Even though a specific embodiment of the invention have been shown and described above, it must be understood that many variations to such embodiment are, in fact possible. Therefore, the invention hereof is not to be considered restricted or limited, except as required by the above technique and by the true intendment of the claims hereafter cited.

We claim:

1. In a Pressing Machine for the manufacture of glass articles, which comprises, a base; a gyratory table composed of mold supporters equidistantly laid out around the table, thereby carrying the molds from one station to the next as the table gyrates intermittently, said table comprising, a number of stations, among which are stations of charging, stations for pressing and cooling articles, extracting stations and stations for the cooling of the molds, wherein each stations includes a series of mechanisms; means to drive the rotating table coupled to said table to rotate the same; and a feeder in combination with said machine which provide a glass gob to the station of charging by each cycle of the machine; an apparatus for controlling the cycle of operation of the machine and the operation of the diverse mechanisms, comprising:

(a) means to determine the instant in which a gob of glass is cut from said feeder;

(b) means to sensing the position of the diverse mechanisms of the machine, to derive signals representative of the movements of each of the mechanisms;

(c) control means for processing the signals provided by the means that detect the cut of the gob and the means that detect the position of the mechanisms in order to start the machine cycle by each cut of gob and for determining through of the means that sensing the position of the mechanisms the indexing of said table; and, (d) a valve block connected to said control means to actuate the individual mechanism of the machine in accordance with the signals that are send by said control means.

2. The apparatus as claimed in claim 1, wherein the control means comprising: a coupler card to receive all the signals detected by the means that determine the cut of gob and movement of the mechanism; and, a controller card to process all the variables of the machine cycle, said controller card having a fixed memory to store the sequence of operations of the machine; a floating memory to store the timing of certain other variables of said sequence; and an operator panel to receive and provide information to said controller card.

3. The apparatus as claimed in claim 1, wherein the control means includes: a printer to obtain the operation time of each one of the mechanism of the machine.

4. The apparatus as claimed in claim 1, wherein the control means includes: remote interrupt stations to stop either totally or partially the pressing machine.

5. The apparatus as claimed in claim 1, wherein the means to determine the instant in which the gob of glass is cut and the means to sensing the position of the diverse mechanisms are proximity sensors.

6. The apparatus as claimed in claim 5, wherein, the proximity sensors are sensors placed at the take out mechanism, pressing mechanism, funnel mechanism, piston mechanism, pusher mechanism and the table of the machine.

7. In a Pressing Machine for the manufacture of glass articles, which comprises, a base; a gyratory table composed of mold supporters equidistantly laid out around the table, thereby carrying the molds from one station to the next as the table gyrates intermittently, said table comprising a number of stations, among which are stations of charging, stations for pressing and cooling articles, extracting stations and stations for the cooling of the molds, wherein each stations includes a series of mechanisms; means to drive the rotating table coupled to said table to rotate the same; and a feeder in combination with said machine which provide a glass gob to the station of charging by each cycle of the machine; the method for controlling the cycle of operation of the machine and the operation of the diverse mechanisms, comprising the steps of:

detecting through a first sensor the instant when a gob of glass is cut of the feeder;

sensing, through of sensor means, the diverse mechanisms of the machine, to derive signals representative of the movements of each mechanism;

supplying said signals provided by the first sensor and the sensor means to control means for processing all the signals that was obtained of the sensors in order to start the machine cycle in accordance with the first sensor and for determining through the sensors of the mechanisms the operation of said mechanisms; and, determining in response to said signals the movement of each mechanism of the pressing machine in order to avoid collision between each of them and for the indexing of the table of the machine.

8. The method of the claim 7 wherein the step of sensing, through of the sensor means, the diverse mechanism of the machine comprising:

determining in response to said sensor means the pressing time into the mold wherein the control means choose between either the operator's time or the time detected by said sensor means to determine if the next operation can be commenced.

* * * * *